US008502457B2

(12) United States Patent
Shew

(10) Patent No.: US 8,502,457 B2
(45) Date of Patent: Aug. 6, 2013

(54) LIGHT ASSEMBLY

(76) Inventor: Jeremy M. Shew, Swartz Creek, MI (US)

( * ) Notice: Subject to any disclaimer, the term of this patent is extended or adjusted under 35 U.S.C. 154(b) by 227 days.

(21) Appl. No.: 12/925,126

(22) Filed: Oct. 13, 2010

(65) Prior Publication Data

US 2011/0163678 A1    Jul. 7, 2011

Related U.S. Application Data

(60) Provisional application No. 61/251,150, filed on Oct. 13, 2009.

(51) Int. Cl.
*H05B 37/00*    (2006.01)
*F21V 1/00*    (2006.01)

(52) U.S. Cl.
USPC ............ 315/162; 315/363; 362/227; 362/240

(58) Field of Classification Search
USPC ................... 313/318, 46; 362/800, 33, 240, 362/253, 254, 227; 315/51, 162, 163, 362, 315/363
See application file for complete search history.

(56) References Cited

U.S. PATENT DOCUMENTS

| 5,113,044 | A  | * | 5/1992 | Tomberlin | 200/51.04 |
| 5,717,179 | A  | * | 2/1998 | Meyer | 200/61.81 |
| 6,874,911 | B2 | * | 4/2005 | Yoneda | 362/294 |
| 7,484,860 | B2 | * | 2/2009 | Demarest et al. | 362/253 |
| 2005/0135107 | A1 | * | 6/2005 | Currie et al. | 362/382 |
| 2008/0001551 | A1 | * | 1/2008 | Abbondanzio et al. | 315/291 |

* cited by examiner

*Primary Examiner* — Jimmy Vu
*Assistant Examiner* — Borna Alaeddini
(74) *Attorney, Agent, or Firm* — L.C. Begin & Associates, PLLC

(57) ABSTRACT

Light assemblies may contain a light socket assembly powered by an alternating current source, the light socket assembly containing a female socket for threadedly or otherwise receiving a light bulb or a retrofit socket, for example. An AC/DC converter electrically communicates with the light socket assembly thereby providing direct current to the light socket assembly. A first set of direct current contacts communicating with the AC/DC converter is formed within or about the light socket assembly. A solid state lighting source contains a second set of direct current contacts contained within the solid state lighting source, whereby the second set of direct contacts electrically communicates with and corresponds to the first set of direct current contacts. When assembled, the solid state lighting source such as an annular ring coupled to at least one light emitting diode, operably engages the light socket assembly and is fixed about at least a portion of the light socket assembly.

11 Claims, 11 Drawing Sheets

LIGHT ASSEMBLY

CROSS-REFERENCE TO RELATED APPLICATIONS

This application claims the benefit of U.S. Provisional Application Ser. No. 61/251,150 filed on Oct. 13, 2009.

TECHNICAL FIELD

The present invention relates to light assemblies containing solid state lighting, and more particularly, to standard light assemblies incorporating novel night-lighting feature(s).

BACKGROUND OF THE INVENTION

The present invention relates to light assemblies that incorporate a night light along with typical lighting such as that imparted by light bulbs. Alternatively, the novel night light of the present invention may, if properly tailored to increase the illumination, conceivably replace the conventional lighting altogether while yet utilizing the conventional lighting equipment configuration.

Presently, there are various night lights that incorporate a single light bulb, and are powered by AC energy or power from a wall socket. The overall safety of the traditional night lights that are plugged into wall sockets is generally believed to be good. However, it can be appreciated that these night lights may be within reach of a curious child. Furthermore, the night lights that are plugged into lower outlets, perhaps one foot from the floor, may only provide light at substantially that level. Additionally, the availability of a wall socket at that height might be inhibited by placement of furniture, whereby any light emitted from a night light would be blocked by a chair, for example. As a result, it may still be challenging to navigate about a room in the dark, even with a night light at a typical height of about one foot from the floor. Even if a wall socket is suitably located, it would then reduce the availability of that wall socket for other uses, a vacuum cleaner for example.

SUMMARY OF THE INVENTION

Figure 1:
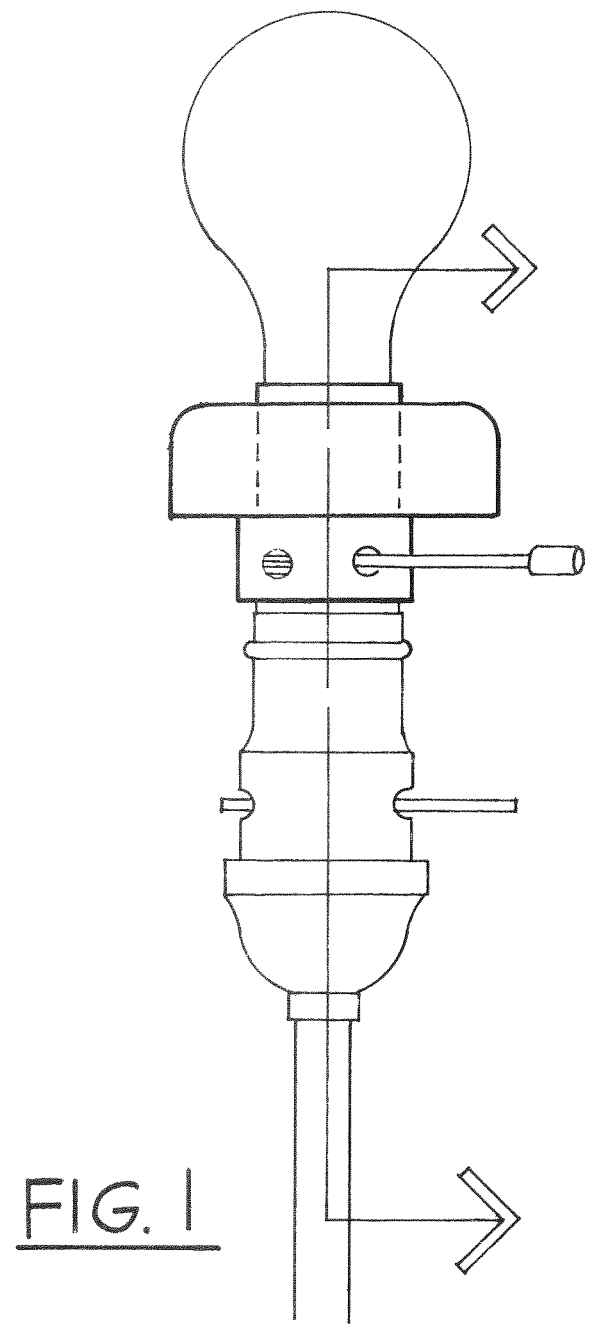
FIG. 1 illustrates a light assembly in accordance with the present invention.

The above-referenced concerns are resolved by a light assembly containing a light socket assembly powered by an alternating current source, the light socket assembly containing an outer periphery and a female socket for receipt of a first solid state light source such as an incandescent light bulb, for example. An alternating current/direct current (AC/DC) converter electrically communicates with the light socket assembly thereby providing direct current to the light socket assembly. A first set of direct current contacts communicating with the AC/DC converter is formed within the light socket assembly or along the outer periphery thereof. A second solid state lighting source may contain an inner annular periphery and a second set of direct current contacts providing along or within the inner annular periphery, the second set of direct current contacts corresponding to the first set of direct current contacts. When assembled, the second solid state lighting source may slidably engage the outer periphery of the light socket assembly to electronically mate the first and the second sets of direct current contacts.

Yet another embodiment contains a light assembly containing a light socket assembly powered by an alternating current source, the light socket assembly containing a female socket. A retrofit second light socket assembly contains an outer periphery and a male portion that is threadedly or otherwise received within the first female socket, thereby providing electrical power to the second light socket assembly. An alternating current/direct current (AC/DC) converter electrically communicates with the second light socket assembly thereby providing direct current to the second light socket assembly. A first set of direct current contacts communicating with the AC/DC converter is formed along the periphery. A solid state lighting source contains an inner annular periphery and a second set of direct current contacts contained along the inner annular periphery, whereby the second set of direct contacts corresponds to the first set of direct current contacts. When assembled, the solid state lighting source slidably engages the periphery of the second light socket assembly to electronically mate the first and the second sets of direct current contacts.

More broadly, the current light assemblies may be stated as containing a light socket assembly powered by an alternating current source, the light socket assembly containing a female socket for threadedly or otherwise receiving a first solid state light source such as a light bulb, or a retrofit socket as described above. An alternating current/direct current (AC/DC) converter electrically communicates with the light socket assembly thereby providing direct current to the light socket assembly. A first set of direct current contacts communicating with the AC/DC converter may be formed within or about the periphery of the light socket assembly. A solid state lighting source contains a second set of direct current contacts contained within the solid state lighting source, whereby the second set of direct contacts electrically communicates with and corresponds to the first set of direct current contacts.

When assembled, the solid state lighting source operably engages the light socket assembly and is fixed about at least a portion of the light socket assembly.

DETAILED DESCRIPTION OF THE INVENTION

Figure 3:
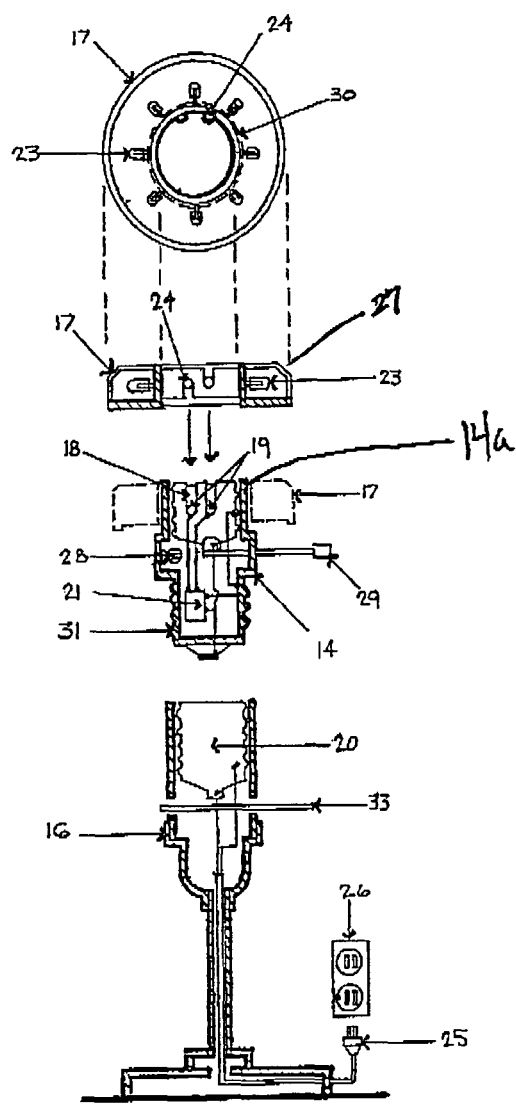
FIG. 3 illustrates an exploded view of the various components of a light assembly as shown in FIG. 1, in accordance with the present invention, whereby a night light subassembly and the main light assembly are actuated by a common switch.
Figure 6:
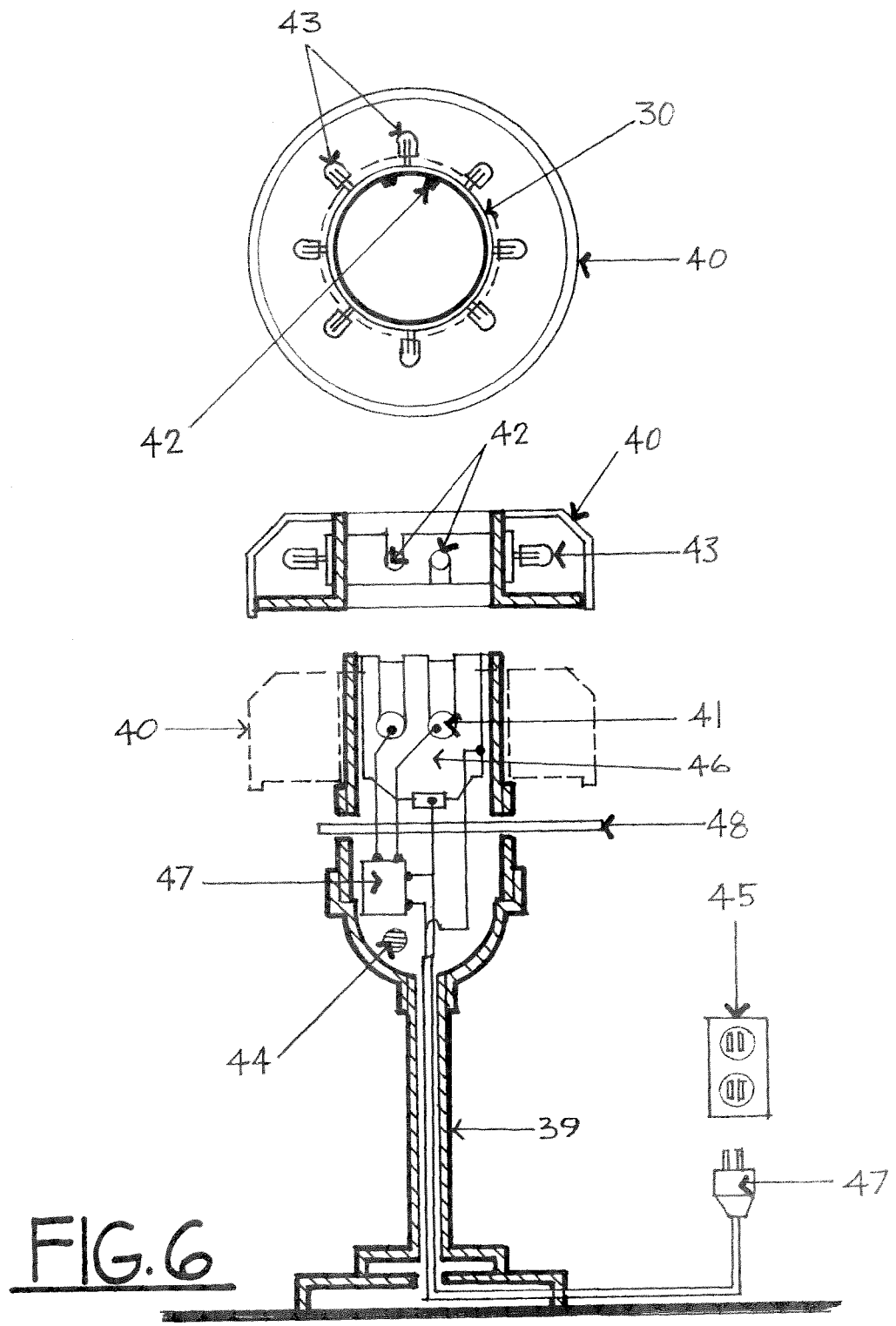
FIG. 6 illustrates a cross-sectional view of a light assembly as shown in FIG. 4, in accordance with the present invention.

The above-referenced concerns are resolved by providing a lighting assembly with a removable night light. A night light of the present invention will advantageously retrofit an existing light assembly. As shown in the figures, a first light assembly 10 incorporates a first light socket assembly 16 connected to a standard AC power supply (e.g. 120 VAC, 60 Hz) such as a plug 26 in the wall, thereby providing power to the rest of the assembly 10. A threaded female socket 20 may be provided in socket assembly 16, for receipt of a light bulb, for example. A switch 33 provides power to socket 20, and may be provided if desired, or, socket 20 may be provided with continuous power. A retrofit or second light socket assembly 14 includes a threaded male portion 31 for threaded engagement with female socket 20 of the socket 16 when the first socket light assembly is a conventional socket for a lamp, for example. As schematically shown in FIGS. 3 and 6, an alternating current/direct current (AC/DC) converter 21 such as a half-wave rectifier or rectifier bridge is housed within socket 16 and used to power a direct current (DC) energy circuit 30. The DC circuit 30 may be formed from standard wiring and/or soldering connections and is schematically represented and exemplified by FIG. 10. A switch 29, when activated or deactivated, controls the AC power to a typical light source such as light bulb 41.

Figure 10:
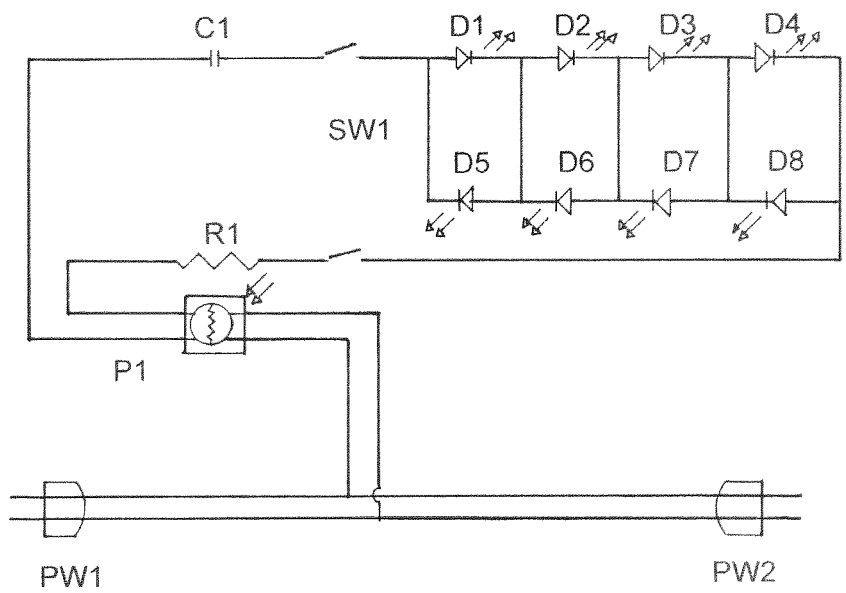
FIG. 10 schematically illustrates one wiring configuration in accordance with the present invention.

If desired, an RC circuit 23 as shown in FIG. 10, or other known circuitry, may alternatively be employed within sockets 14 or 39 respectively. U.S. Pat. No. 7,484,860 (e.g. FIGS. 4 and 5d) and U.S. Patent Application Publication No. US 2008/0001551, both herein incorporated by reference in their entirety, exemplify applicable wiring relative to AC/DC conversion circuits. These circuits may include rectifier bridges, or half-wave rectifier circuitry configured to provide power to a plurality of light emitting diodes. In essence, DC power is supplied directly or indirectly to the LED circuits. With reference to the Figures, it will be appreciated that the DC power in the present invention is provided at an external jack or DC contacts 19 (explained further below) for ready connection to an exterior component such as the subassembly light ring 17, the lamp shade 60, and so forth.

Figure 4:
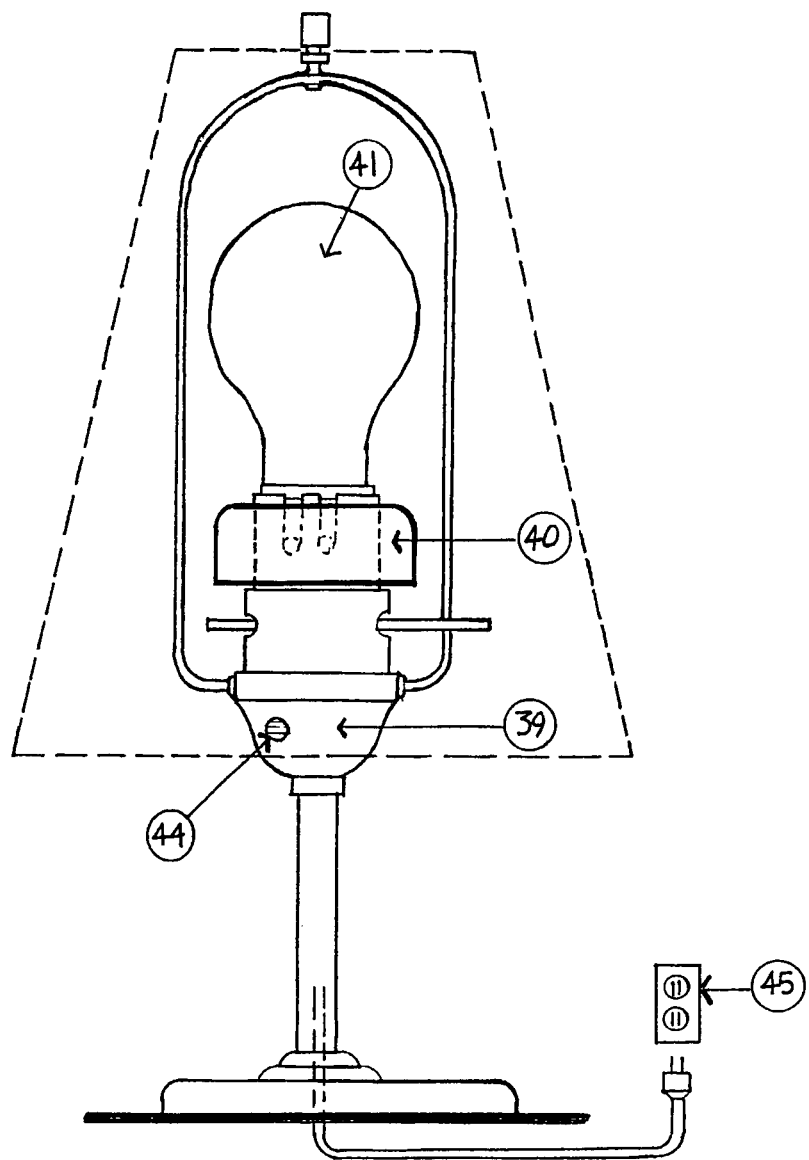
FIG. 4 illustrates another embodiment in accordance with the present invention.
Figure 5:
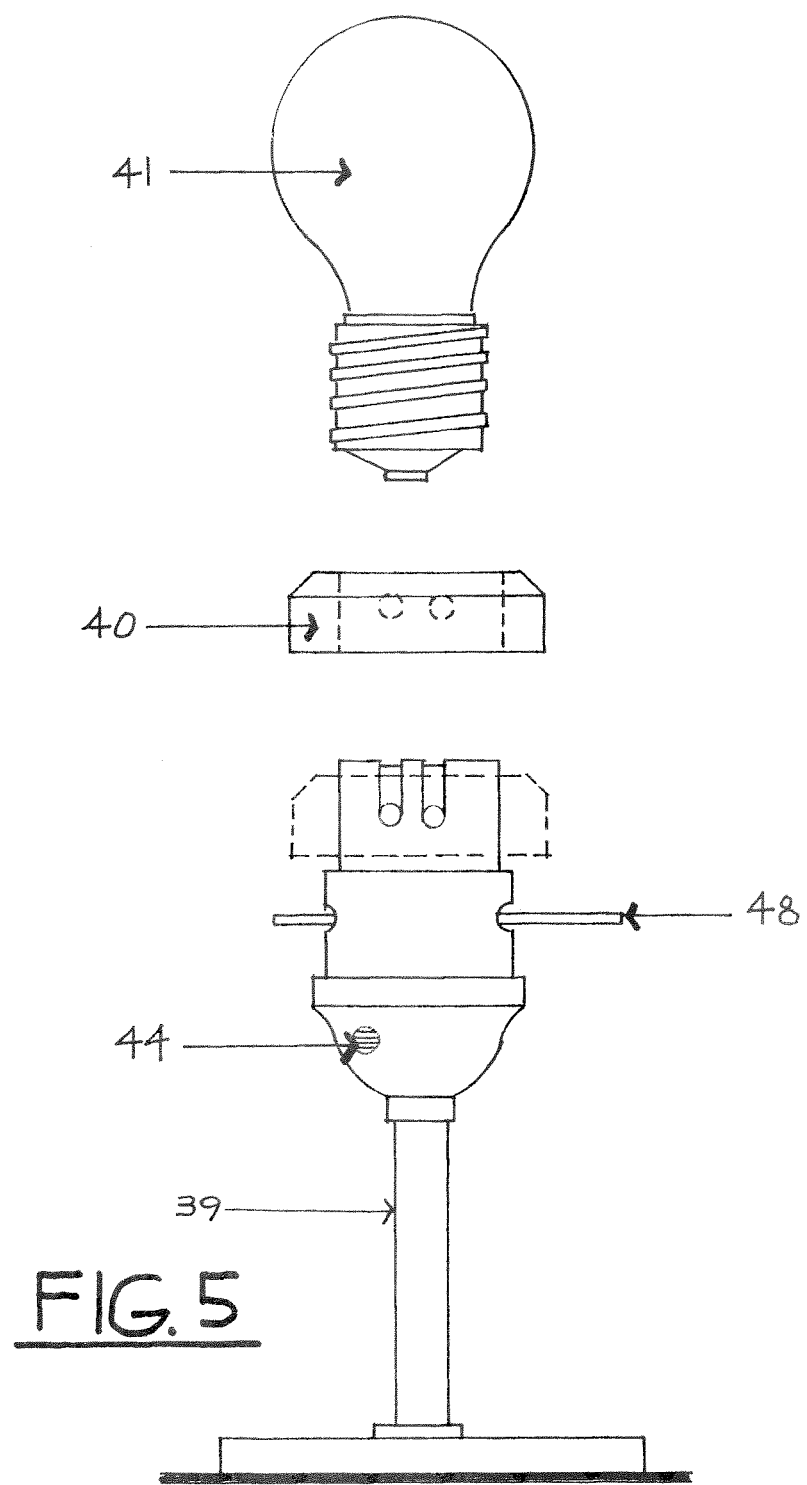
FIG. 5 illustrates yet another embodiment in accordance with the present invention.

In accordance with the present invention, the DC circuit 30 may operate dependently or independently of switch 29 (FIGS. 1-3) or switch 48 (FIGS. 4-6). As such, the DC circuit 30 may be powered continuously by energy provided by the source 26 and the converter 21. Alternatively, a photovoltaic cell 28 may be provided for sensing a reduction in available light around the periphery of the light assembly 10. Alternatively, the DC circuit 30 may be powered by deactivation of switch 29. As the environment darkens to a predetermined lighting value, the photovoltaic cell 28 essentially functions as a switch to provide DC power to a night light subassembly 17 described below. Alternatively, the DC circuit 30 may be powered by motion sensing means as known in the art. In general, the photovoltaic cell 28 may also be referred to as a switch 28 that may be operative based on known technology such as photovoltaic and/or motion sensing switching.

DC electrical contacts 19 may be provided in or about the periphery of socket 14, and electronically communicate with DC converter 21. The contacts 19 may be provided and formed from a conductive material such as carbon steel, that may be shaped as a sphere, a half-sphere, or other suitable shape, and resiliently retained within socket 14, by springs (not shown) for example. Parallel slots 18 may be formed within socket 14, thereby exemplifying and facilitating a seating means of an associated subassembly 17. A DC converter 21 communicates with the DC electrical contacts 19. The DC converter 21, along with other constituents of the present invention, may be made in a known manner.

Figure 9:
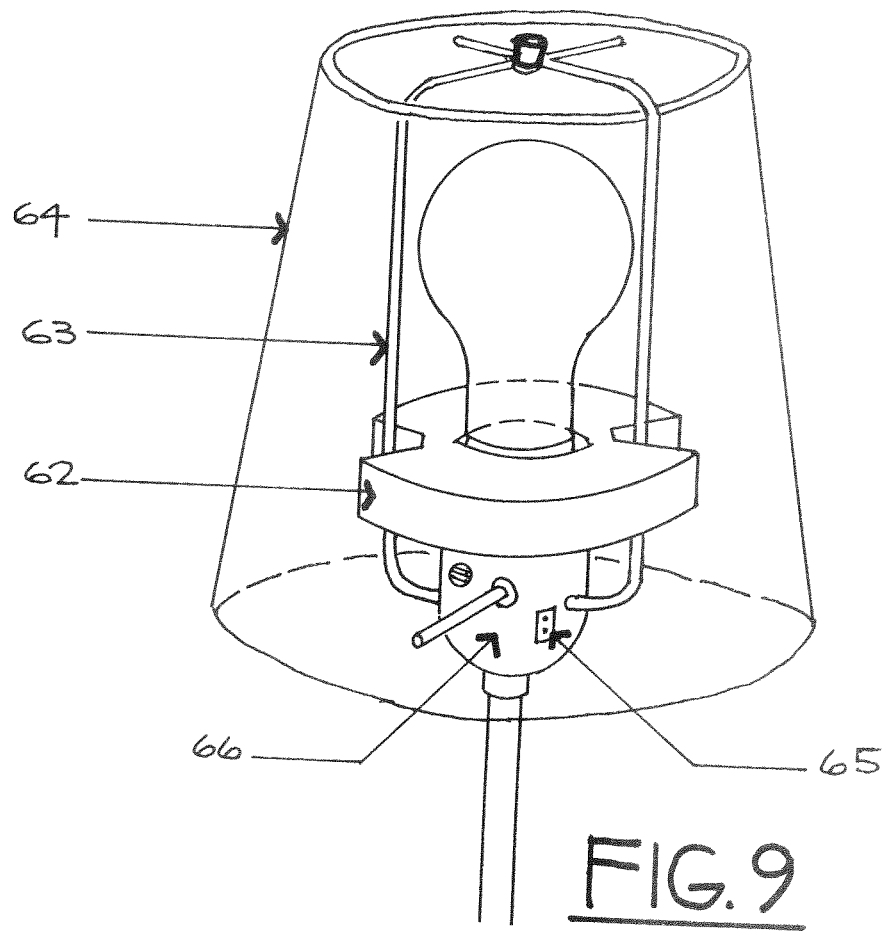
FIG. 9 illustrates yet another embodiment of the present invention, whereby the LED subassembly is shaped to accommodate the architecture of the respective standard light assembly.

In one embodiment, a solid state lighting source or subassembly 17 may be formed as a ring-like or donut-like shape, or any other desirable annular shape, for slidable engagement about the periphery 14a of socket 14. Accordingly, the subassembly 17 may also be formed in any useful shape, such as shown in FIG. 9, thereby accommodating the various other structural components of the light assembly. Night light bulbs, as exemplified in FIG. 3, preferably consists of one or more (or at least one) light emitting diodes (LED) 23 that electronically communicate with DC converter 21 when actuated. Other embodiments (not shown) may incorporate solid state lighting sources or subassemblies 17 in various shapes that operably communicate with the DC contacts 19, and are generally removably fixed about at least a portion of the periphery of either light socket assembly 14 or 16 or otherwise integrated with either light socket assembly 14 or 16.

Night lights 23 may be provided in various colors, and may also be provided with various power ratings or intensity. Light contacts 24, in electronic communication with lights 23 and corresponding with slots 18 and DC electrical contacts 19, protrude from an inner annular periphery 17b of subassembly 17. Light contacts 24 thereby slidable engage with slots 18 when subassembly 17 is inserted about the periphery of socket 14. The slots 18 thereby provide a means to ensure ready seating of subassembly 17 over contacts 19 whereby slidable grooves 18 mandate a certain orientation of subassembly 17 over socket 14. An outer casing 27 of subassembly 17 may be formed from a suitable material such as a transparent or translucent plastic, and, may be formed to direct the LED lights 23 in any desired direction. Injection molding or other known plastic-forming methods are contemplated for the manufacture of outer casing 27, for example.

Figure 2:
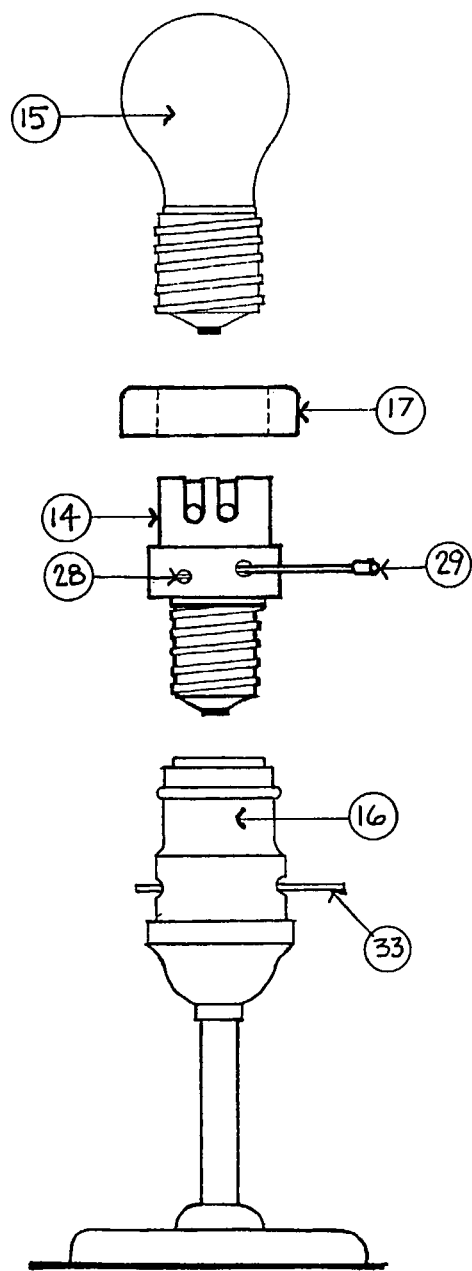
FIG. 2 illustrates an exploded view of the various components of a light assembly in accordance with the present invention.

FIGS. 4-6 illustrate a lighting assembly provided with a single switch 48, whereby it is contemplated that this configuration would be offered as a new lighting assembly. All other components of the lighting assembly 10 are essentially the same. Accordingly, it is contemplated that a night light configuration as illustrated in FIGS. 1-3 can be either provided to retrofit existing light assemblies, or, as illustrated in FIGS. 4-6, as new lighting assemblies. It will also be appreciated that the lighting assemblies of FIGS. 4-6 may also incorporate an exterior DC jack 42 on the single socket assembly 39.

Figure 7:
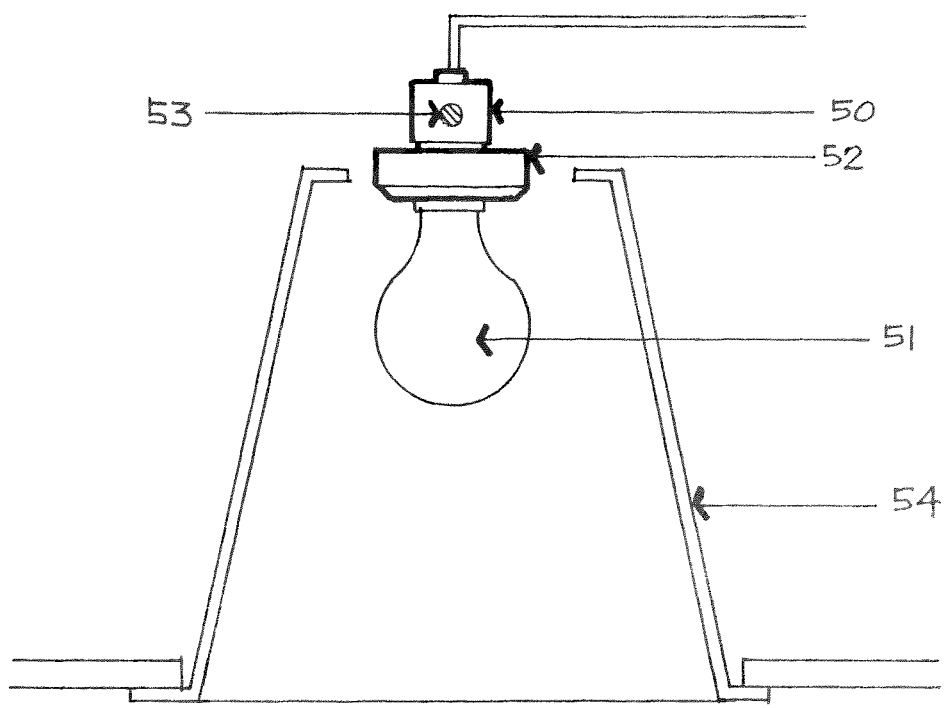
FIG. 7 illustrates yet another embodiment of the present invention.
Figure 8:
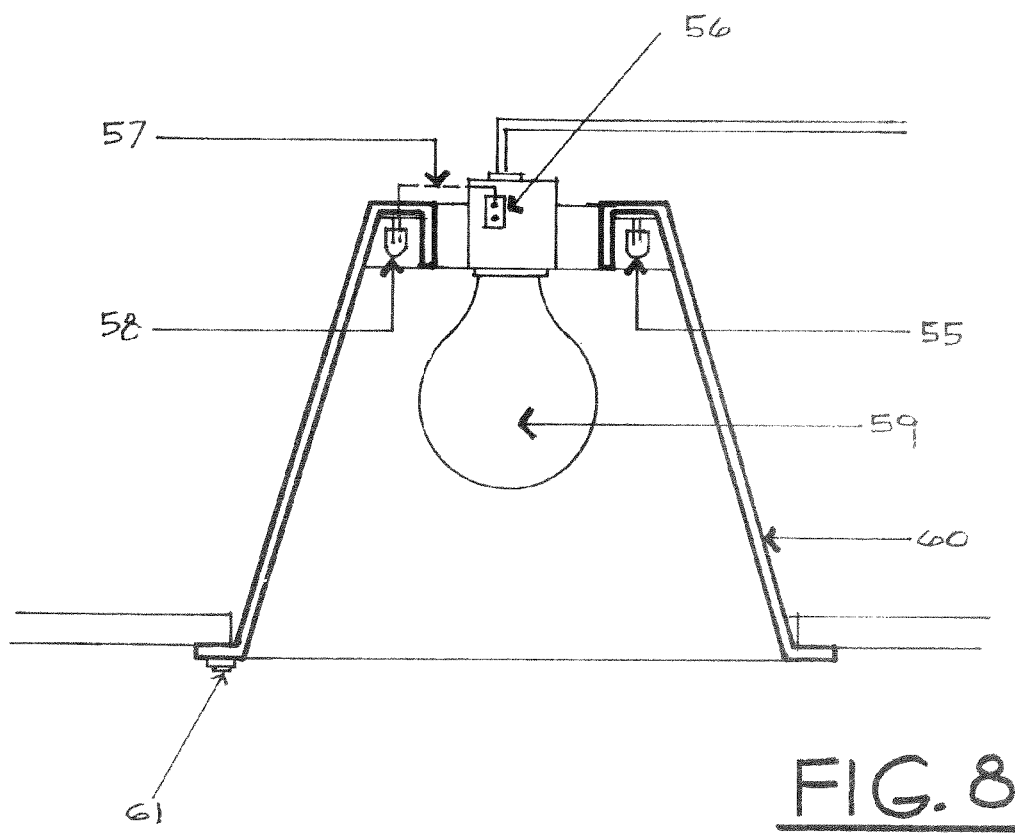
FIG. 8 illustrates yet another embodiment of the present invention wherein an AC/DC converter is utilized to power lighting within a lamp shade, in accordance with the present invention.
Figure 11:
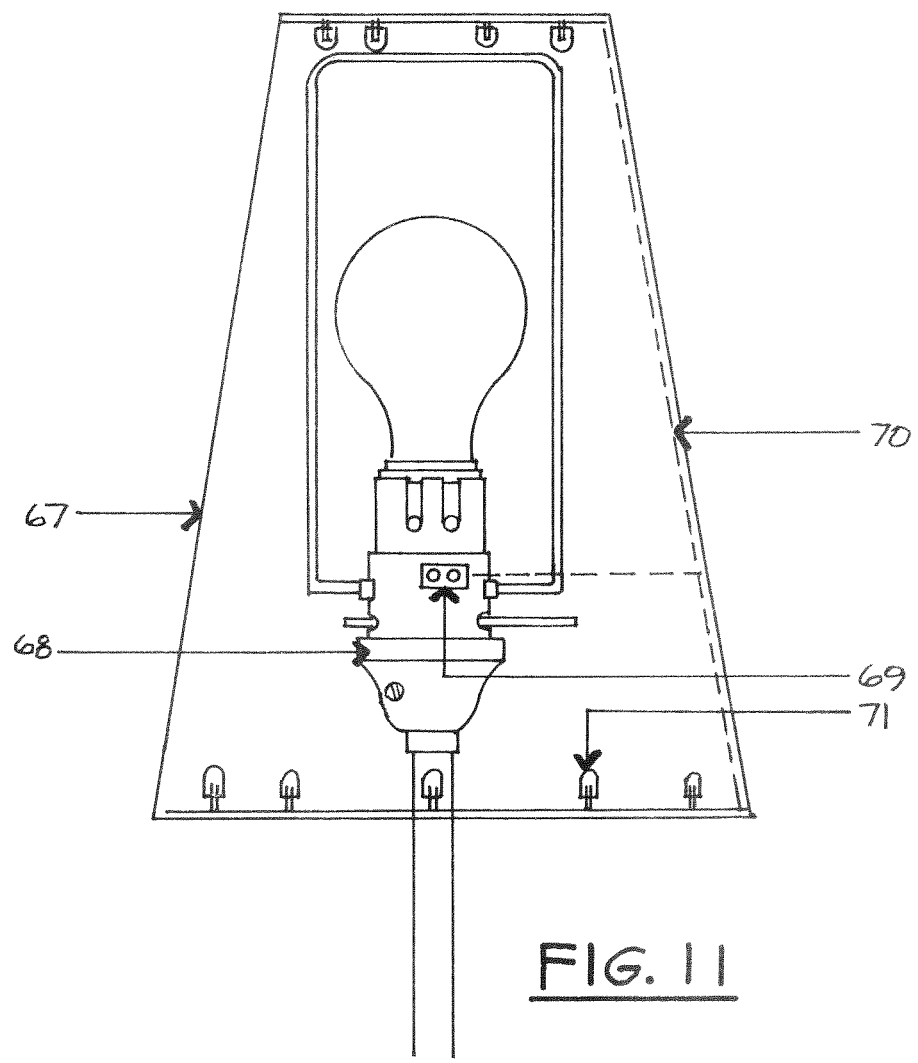
FIG. 11 illustrates yet another embodiment of the present invention wherein an AC/DC converter is utilized to power lighting within a lamp cover, in accordance with the present invention.

As shown in FIG. 7, the subassembly 17 may be inverted for overhead lighting. As shown in FIG. 8, the socket 14 may alternatively or additionally provide a DC connector thereby providing an external connector to power remote devices or exterior components. For example, as shown in FIG. 8 or FIG. 11, a plurality of LED lights 55/71 may be mounted within the periphery of a lamp shade 60/67, again powered by an external jack 56/69 vis a vis connector 57/70.

As shown in FIG. 9, the subassembly 17/62 may be shaped to avoid the holders 63 of lamp shade 64. A socket 66 may contain an exterior jack 65 electronically communicating with the AC/DC rectifier or converter, for powering of various appliances such as a DC powered decorative light assembly, a cigarette fan, or any other remote DC powered appliance.

Finally, and more broadly, the current light assemblies may be stated as containing a light socket assembly powered by an alternating current source, the light socket assembly containing a female socket for threadedly or otherwise receiving a solid state light source such as a light bulb or a retrofit socket as described above. An alternating current/direct current (AC/DC) converter electrically communicates with the light socket assembly thereby providing direct current to the light socket assembly. A first set of direct current contacts communicating with the AC/DC converter is formed within or about the periphery of the light socket assembly. A solid state lighting source such as an annular ring coupled to at least one light emitting diode, contains a second set of direct current contacts contained within the solid state lighting source, whereby the second set of direct contacts electrically communicates with and corresponds to the first set of direct current contacts. When assembled, the solid state lighting source operably engages the light socket assembly and is fixed about at least a portion of the light socket assembly.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the various permutations described herein. For example, various known light assemblies incorporate various sockets that differ in design from the light sockets shown throughout FIGS. 1-11. Nevertheless, it is believed that a subassembly 17 could be provided for any number of differently designed sockets so long as each socket was also fitted or formed with an exterior DC jack and/or DC electrical contacts 19, in accordance with the present invention. The subassembly or LED assembly would simply have to accommodate the architecture of the particular light assembly, thereby ensuring slidable engagement between an LED assembly and the respective exterior DC electrical contacts 19.

What is claimed is:

1. A light assembly comprising:
a light socket assembly powered by an alternating current source, said light socket assembly containing an outer periphery and a female socket for receipt of a solid state light bulb;
an alternating current/direct current converter electrically communicating with said light socket assembly;
a first set of direct current contacts formed along said outer periphery; and
a solid state lighting source containing an inner annular periphery and a second set of direct current contacts corresponding to said first set of direct current contacts,
wherein said solid state lighting source slidably engages said outer periphery of said light socket assembly to electronically mate said first and said second sets of direct current contacts.

2. A light assembly comprising:
a light socket assembly powered by an alternating current source, said light socket assembly containing a first female socket;
an alternating current/direct current converter electrically communicating with said light socket assembly;
a second light socket assembly containing a male portion for receipt within said first female socket, said second light socket assembly containing an outer periphery and a second female socket for receipt of a solid state light bulb;
a first set of direct current contacts formed along said outer periphery; and
a solid state lighting source containing an inner annular periphery and a second set of direct current contacts corresponding to said first set of direct current contacts,
wherein said solid state lighting source slidably engages said outer periphery of said second light socket assembly to electronically mate said first and said second sets of direct current contacts.

3. A light assembly comprising:
a first light socket assembly powered by an alternating current source, said first light socket assembly containing an outer periphery and a female socket for receipt of a first solid state lighting source;
an alternating current/direct current converter electrically communicating with said first light socket assembly;
a first set of direct current contacts electrically communicating with said converter and formed within said first light socket assembly; and
a second solid state lighting source containing a second set of direct current contacts for electrically communicating with said first set of direct current contacts,
wherein said second solid state lighting source is removably engaged with at least a portion of said outer periphery of said first light socket assembly to electronically mate said first and said second sets of direct current contacts.

4. The light assembly of claim 3 wherein said second solid state light source is an annular ring coupled to at least one light emitting diode.

5. The light assembly of claim 3 wherein said first light socket assembly further comprises a direct current jack for actuation of a remote device.

6. The light assembly of claim 3 wherein said light assembly further comprises a second light socket assembly, said second light socket assembly threadedly receiving said first light socket assembly.

7. The light assembly of claim 3 wherein said second solid state light source comprises a plurality of light emitting diodes.

8. The light assembly of claim 3 further comprising a photovoltaic sensor electrically communicating with and actuating said second solid state light source.

9. The light assembly of claim 3 further comprising a motion sensor electrically communicating with and actuating said solid state light source.

10. The light assembly of claim 3 wherein said second solid state light source slidably engages said periphery of said first light socket assembly to mate said first and second sets of direct current contacts.

11. The light assembly of claim 3 wherein said first solid state light source is an incandescent light bulb.

* * * * *